United States Patent
Pappu

(10) Patent No.: US 10,410,560 B2
(45) Date of Patent: Sep. 10, 2019

(54) DISPLAY CONTROLLER TESTING THROUGH HIGH SPEED COMMUNICATIONS SWITCH

(71) Applicant: Intel Corporation, Santa Clara, CA (US)

(72) Inventor: Lakshminarayana Pappu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 15/461,385

(22) Filed: Mar. 16, 2017

(65) Prior Publication Data

US 2018/0268749 A1    Sep. 20, 2018

(51) Int. Cl.
| | | |
|---|---|---|
| G09G 3/00 | (2006.01) | |
| G06F 3/14 | (2006.01) | |
| G09G 3/20 | (2006.01) | |
| G09G 5/00 | (2006.01) | |

(52) U.S. Cl.
CPC ............... *G09G 3/006* (2013.01); *G06F 3/14* (2013.01); *G09G 3/2096* (2013.01); *G09G 5/003* (2013.01); *G09G 2370/10* (2013.01)

(58) Field of Classification Search
CPC ............................ G09G 3/006; G09G 2370/04
See application file for complete search history.

(56) References Cited

U.S. PATENT DOCUMENTS

| | | | | |
|---|---|---|---|---|
| 2004/0030968 A1* | 2/2004 | Fan | ......................... | H04L 1/241 714/704 |
| 2012/0206465 A1* | 8/2012 | Yang | ..................... | G06F 13/372 345/534 |
| 2012/0324302 A1* | 12/2012 | Arslan | ............. | G01R 31/31857 714/727 |
| 2016/0011818 A1* | 1/2016 | Hashimoto | ........ | G11C 16/3495 711/103 |

* cited by examiner

*Primary Examiner* — Manuel L Barbee
(74) *Attorney, Agent, or Firm* — Schwabe, Willimson & Wyatt, P.C.

(57) ABSTRACT

Embodiments are generally directed to display controller testing through a high speed communications switch. An embodiment of an apparatus includes a display controller including a first test machine; a high speed switch coupled with the display controller; and one or more physical layer (PHY) logic elements including a first PHY with a second test machine, the first test machine and second test machine being replicas of each other at least in part. The first test machine and the second test machine are operable to synchronously lock with each other, the first test machine to generate a data sequence and transmit the data sequence to the second test machine, the second test machine to generate an expected data sequence and compare the expected data sequence to a received data sequence from the first test machine.

20 Claims, 6 Drawing Sheets

_US 10,410,560 B2_

1

DISPLAY CONTROLLER TESTING THROUGH HIGH SPEED COMMUNICATIONS SWITCH

TECHNICAL FIELD

Embodiments described herein generally relate to the field of electronic devices and, more particularly, display controller testing through a high speed communications switch.

BACKGROUND

As electronic device development continues to advance, the speeds of high speed serial links are approaching 20 Gbits/sec (gigabits per second). Examples include the USB™ (Universal Serial Bus) speeds of 10 GT/sec (gigatransfers per second), Thunderbolt™ technology reaching 20 GT/sec, and other developing technologies.

With such high speed operations, testing of individual components that communicate with each other using these high-speed serial connect technologies in isolation is generally not a viable comprehensive option.

More specifically, testing of a display controller in a system on chip at operational speeds has become increasing difficult in modern systems because of the high speed serial links operating between the controller and the end points, including operation through the high speed switching required for the system operation.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
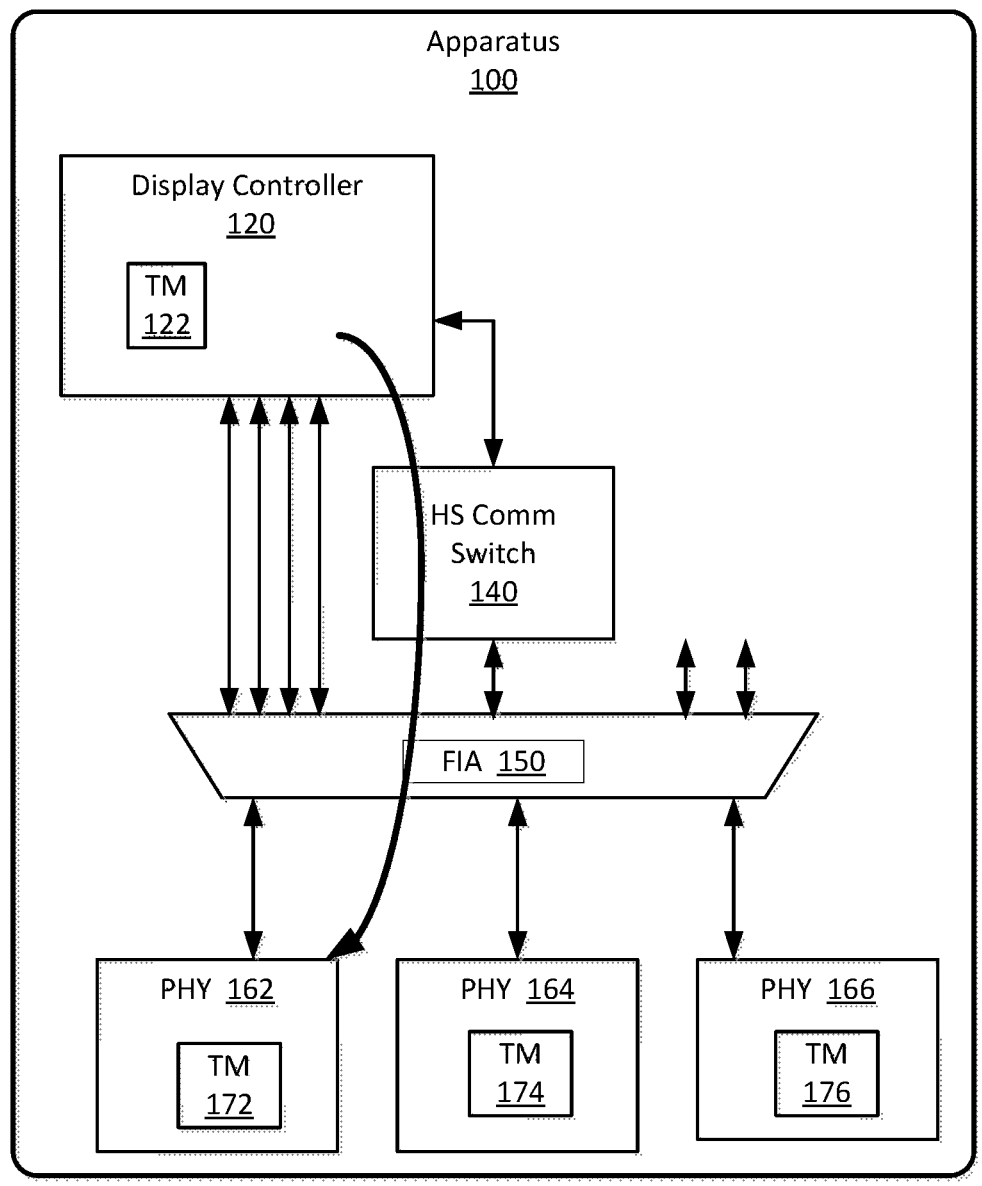
FIG. 1 is an apparatus to provide testing through a high speed communications switch to end devices according to an embodiment.

Embodiments relate to display controller testing through a high speed communications switch.

Testing of individual components that communicate with each other with modern high-speed serial connect technologies in isolation is increasing difficult. High-speed serial connects include the USB™ (Universal Serial Bus) type-C. The type-C subsystem enables multiple traffic types, including PCIE (Peripheral Component Interconnect Express) and USB, providing display operation through the Thunderbolt™ (which may be referred to here as TBT) interface via a flexible IO (input output) adapter (FIA) and PHY (physical layer) analog logic to the end point devices. Thunderbolt is a high speed communication interface that allows the connection of external peripherals to a computer. Thunderbolt combines PCI Express (PCIe) and DisplayPort (DP) into one serial signal on a single cable connection.

In some embodiments, a testing mechanism provides paths for testing display controller operation through a switch connector for high speed serial operation, such as Thunderbolt technology, the device including PHY logic for connection of end point devices. In some embodiments, the testing mechanism allows for testing through the switch without requiring the normal high-speed operation. In some embodiments, an apparatus or system provides capability to transfer or shift testing and sequencing of data operations from a test machine of the display engine to a test machine of the media endpoint physical layer (PHY) logic elements (MG-PHY) via the communications switch to enable the testing process.

In some embodiments, test machines are replicated at least in part in the display engine and in each of the PHY logic elements. In some embodiments, the test machines are utilized to perform a training process in the display controller, including sending a data package containing a Test Sequence Ordered Set and a Training Sequence Pattern Set, and utilizing such data to ensure that the testing machines in both the display engine block and the PHY logic element are locked. The process then continues with the test machine of the display transmitting a data sequence, such as a PRBS (pseudorandom binary sequence) pattern, based on a polynomial to the test machine of the PHY. The test machine of the PHY logic element then operates to generate an expected data sequence based on the same PRBS polynomial, compare the incoming data to the expected data sequence, and identify and log any errors to evaluate the operation of the components in the testing process.

In some embodiments, a testing mechanism is to enable data packet traffic in a Type-C subsystem from display engine to each PHY logic element through the high speed Thunderbolt switch, and FIA (Flexible IO Adapter) network. In some embodiments, finite state machines (FSMs) are present in test machines at both the source and destination to enable the display engine and the respective PHY logic element to work to operate in lock step fashion. In some embodiments, a testing process includes locking the FSMs with training sequences and providing error checking at the PHY logic element during the transmission. In some embodiments, the replicated test engines are to train each other and lock in synchronization, and thus can check whether the data that is transmitted is good or not. If there is a match at the receiving test machine based on the comparison between the received data and the generated data, then it may be concluded that there is a good result, and otherwise it may be concluded that the result is bad.

FIG. 1 is an apparatus to provide testing through a high speed communications switch to end devices according to an embodiment. In some embodiments, an apparatus 100, such as a CPU (Central Processing Unit) chip or other processing element, includes a display controller 120 to provide display data to each of multiple end devices, the physical layer logic for each end device being illustrated as PHY 162, 164, and 166. As illustrated, the apparatus includes a high speed communications switch 140, such as a Thunderbolt technology switch, and an IO (input output) adapter (Flexible IO Adapter (FIA)) 150 to direct data from multiple elements to the end device PHY 162, 164, and 166.

In some embodiments, the apparatus 100 further includes a test machine 122 including an FSM in the display controller 120, wherein the test machine 122 is replicated at least in part in each of the end point PHYs, such as test machine 172 for PHY 162, test machine 174 for PHY 164, and test machine 176 for PHY 166. As described herein, test machine 122 may be referred to as the transmitting test machine and test machines 172, 174, and 176 may be referred to as the receiving test machines.

In some embodiments, a testing process for a display controller through a high speed communications switch may include:

(1) In the apparatus, test machines that are the same at least in part are provided in both the display controller 120, as the transmitting test machine 122, and in each of the PHY logic elements 162-166, including receiving test machine 172 of PHY 162. Stated in another way, the transmitting test machine 122 is replicated at least in part in the receiving test machines 172-176 of the end point PHY logic elements 162-166.

(2) In the testing structure, the transmitting test machine 122 in the display controller 120 initiates a training process, wherein the training process in a particular example includes:

(a) Sending data packets containing a Test Sequence Ordered Set from the transmitting test machine 122 to the receiving test machine 172 of PHY 162 (or any other of the physical layer logic elements).

(b) Sending data packets containing a Training Sequence Pattern Set from the transmitting test machine 122 to the receiving test machine 172 of PHY 162, the Training Sequence Pattern Set being a pattern ordered set; and (c) The finite state machines of the transmitting and receiving testing machines 122 and 172 are synchronously locked together to enable the test operation.

(3) Generating and transmitting a data sequence, such as a PRBS (pseudorandom binary sequence) pattern, from the transmitting test machine 122 to the receiving test machine 172, the data sequence being generated using a particular polynomial. In one specific example, the polynomial may be $f(x)=X^{23}+X^{16}+X^{5}+1$. However, embodiments are not limited to any particular polynomial sequence. The data is sent for N-programmed cycles.

(4) (a) Generating at the receiving test machine 172 an expected data sequence based on the same polynomial, and receiving incoming data from the transmitting test machine;

(b) Comparing the incoming data received by the receiving test machine 172 with the expected data sequence that is generated by the receiving test machine 172, and (c) Logging any errors identified in the comparison between the incoming data and the expected data sequence.

In some embodiments, the operation of the apparatus 100 enables testing of the components of the apparatus without requiring testing at operational speeds because the replication at least in part of the test machine in the PHY logic enables the synchronous locking of the FSMs of the transmitting and receiving test machines, and the generation of a data sequence at both the transmitting test machine and the receiving test machine, thus enabling comparison of the expected data to incoming data at the PHY logic.

In a particular example, the Test Sequence Ordered Set is the Equalization Training Sequence (TSEQ) ordered set as shown in Table 1, and the Training Sequence Pattern Set is as shown in Table 2.

TABLE 1

Test Sequence Ordered Set

| Symbol # | Name | Value |
|---|---|---|
| 0 | k28.5 | COM (comma) |
| 1 | D31.7 | 0xFF |
| 2 | D23.0 | 0x17 |
| 3 | D0.6 | 0xC0 |
| 4 | D20.0 | 0x14 |
| 5 | D18.5 | 0xB2 |
| 6 | D7.7 | 0xE7 |
| 7 | D2.0 | 0x02 |
| 8 | D2.4 | 0x82 |
| 9 | D18.3 | 0x72 |
| 10 | D14.3 | 0x6E |
| 11 | D8.1 | 0x28 |
| 12 | D6.5 | 0xA6 |
| 13 | D30.5 | 0xBE |
| 14 | D13.3 | 0x6D |
| 15 | D31.5 | 0xBF |
| 16-31 | D10.2 | 0x4A |

TABLE 2

Training Sequence Pattern Set

| Symbol # | Name | Value |
|---|---|---|
| 0-3 | k28.5 | COM (comma) |
| 4 | D0.0 | 0xFF |
| 5 | D23.0 | 0x17 |
| 6 | D18.5 | 0xB2 |
| 7-15 | D8.1 | 0x28 |

Figure 2:
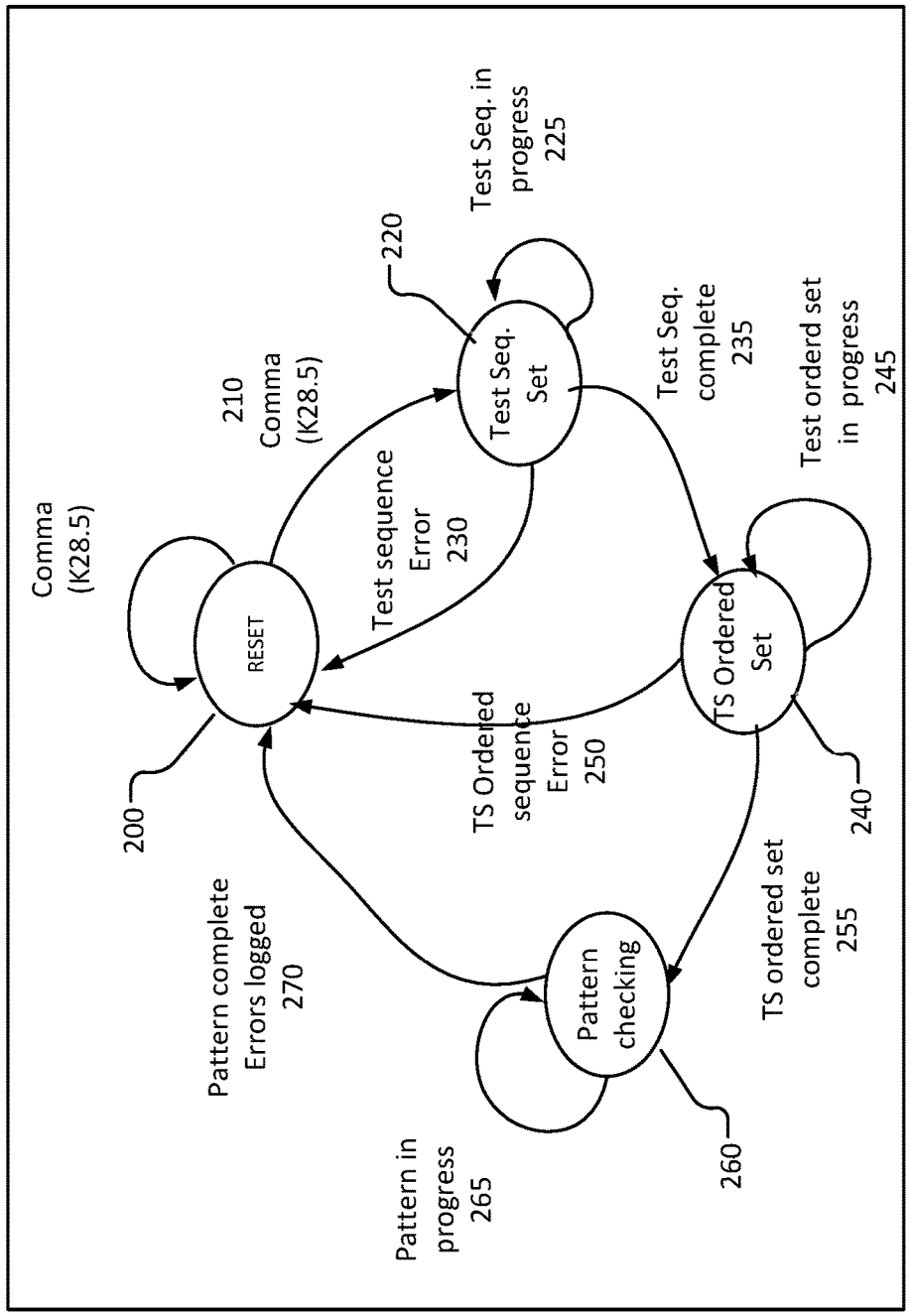
FIG. 2 is an illustration of communication between the display controller and an end point according to an embodiment.

FIG. 2 is an illustration of communication between the display controller and an end point according to an embodiment. As illustrated in FIG. 2, a finite state machine (FSM) of a receiving test machine communicates with a FSM of an endpoint PHY logic element in an operation to test components through a high speed switch. In some embodiments, the sequence of the FSM is the following:

Reset stage 200: In a reset stage, the process proceeds with the provision of symbols 210 (such as Comma, K28.5 illustrated in FIG. 2) for the Test Sequence state 220.

Test Sequence Stage 220: The training sequence is tested 225. Upon identification of a training sequence error 230, there is return to Reset stage 200 to regenerate the elements of the test sequence. Upon the testing of the traffic sequence being completed, 235 the process continues with testing of the Test Sequence Order Set 240.

Testing Test Sequence Ordered Set 240: The Test Sequence Ordered Set is tested 245. Upon identifying an error in the ordered sequence, the error is returned 250 to the Reset stage 200. Otherwise, the test sequence ordered set is complete 255, enabling the synchronous locking of the FSMs for the transmitting test machine and the receiving test machine. The Training Sequence testing 225 and the Test Sequence testing 245 are process in the illustrated loops, the FSM to come out of each loop after a certain programmable N number of cycles.

Pattern testing 260: The pattern checking 265 includes comparing expected pattern data generated by the receiving test machine with the data received by the receiving test machine from the transmitting test machine, and logging of any errors in the pattern checking. Upon completion of the pattern checking, the error log is returned for analysis 270.

Figure 3:
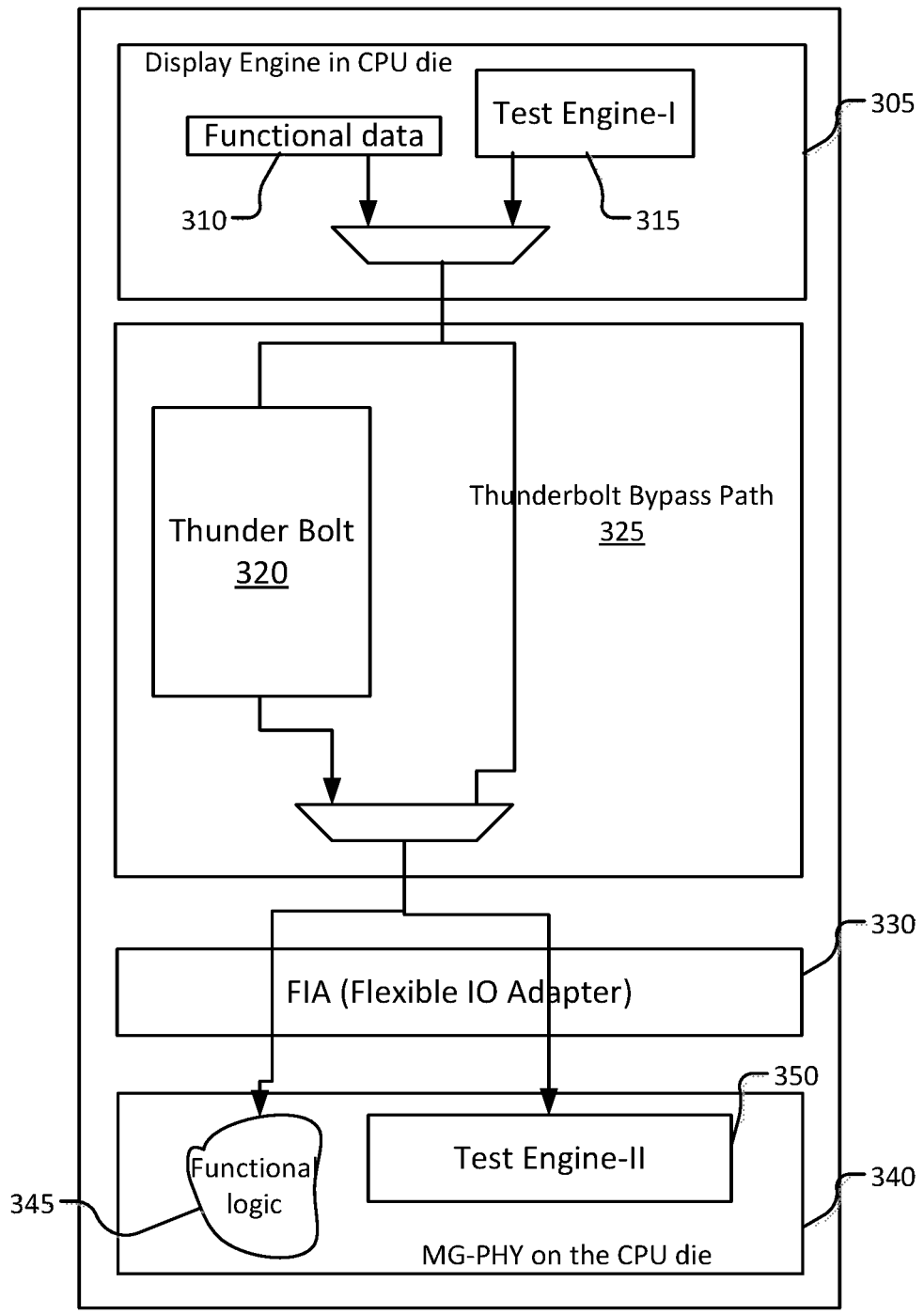
FIG. 3 illustrates data interaction in a testing process between a display engine and an endpoint physical layer according to an embodiment.

FIG. 3 illustrates data interaction in a testing process between a display engine and a PHY logic element according to an embodiment. In some embodiments, a display engine 305 of a CPU die is operable to switch between providing functional data 310 and providing data packages from a Test Engine-I 315 (a transmitting test engine).

The functional data will be conventionally transferred via a Thunderbolt switch 320. However, in some embodiments the transmission of data packets by the test engine 315 through the Thunderbolt switch transforms the data going through the switch, and thus a bypass path 325 is effectively formed by Test Engine-I 315 for the establishment of the testing by the display engine and PHY logic.

The test packets transmitted by Test Engine-I 315 then are directed by a flexible IO adapter (FIA) 330 to the endpoint PHY logic element (MG-PHY) 340 on the CPU die. While the FIA 330 is to transfer functional data 310 to functional logic 345 of the PHY logic element 340, the FIA transfers the test packets to a second test engine, Test Engine-II 350 (a receiving test engine).

Figure 4:
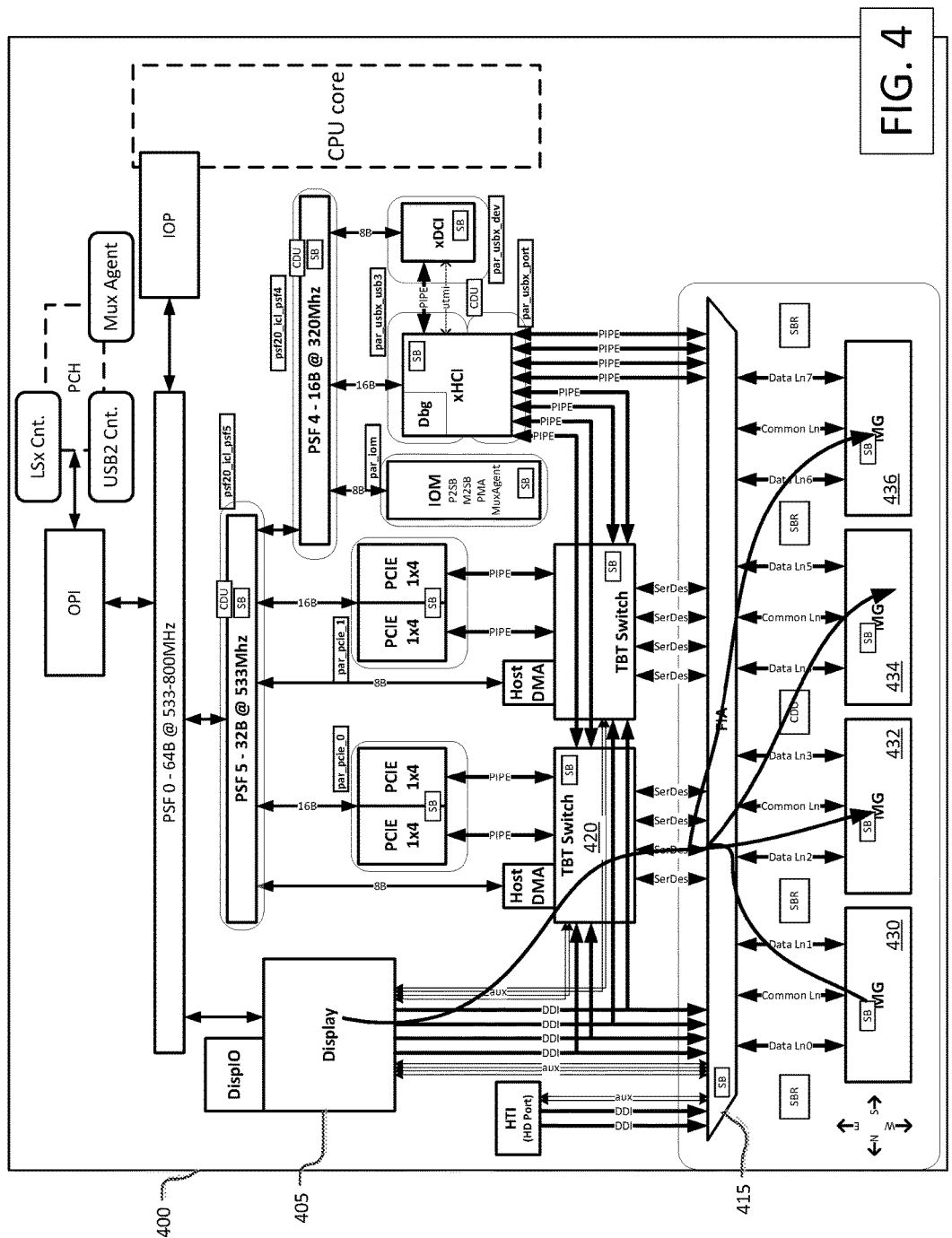
FIG. 4 illustrates a CPU (Central Processing Unit) chip including testing mechanisms to enable testing through a high speed switch according to an embodiment.

FIG. 4 illustrates a CPU chip including testing mechanism to enable testing through a high speed switch according to an embodiment. As illustrated, a CPU chip or unit 400 includes many elements that are beyond the discussion provided herein, and are not separately labeled in FIG. 4 or described herein.

In some embodiments, a CPU chip 400 includes a display controller 405 that is operable to provide for end point devices, FIG. 4 illustrating the PHY logic elements (MG-PHYs) 430, 432, 434, and 436 for each such end point devices. FIG. 4 further illustrates a Thunderbolt (TBT) switch 420 and flexible IO adapter (FIA) 415, together with illustration of data paths from the display controller 405 to the PHY logic elements 430, 432, 434, and 436.

In some embodiments, the CPU chip 400 further includes a test machine that is replicated at least in part in the display controller 405 and in each of the PHY logic elements 430, 432, 434, and 436, wherein the test machines may be utilized to train and lock each other to enable testing through the TBT switch 420 without requiring testing operations at the high speed of the TBT switch.

Figure 5:
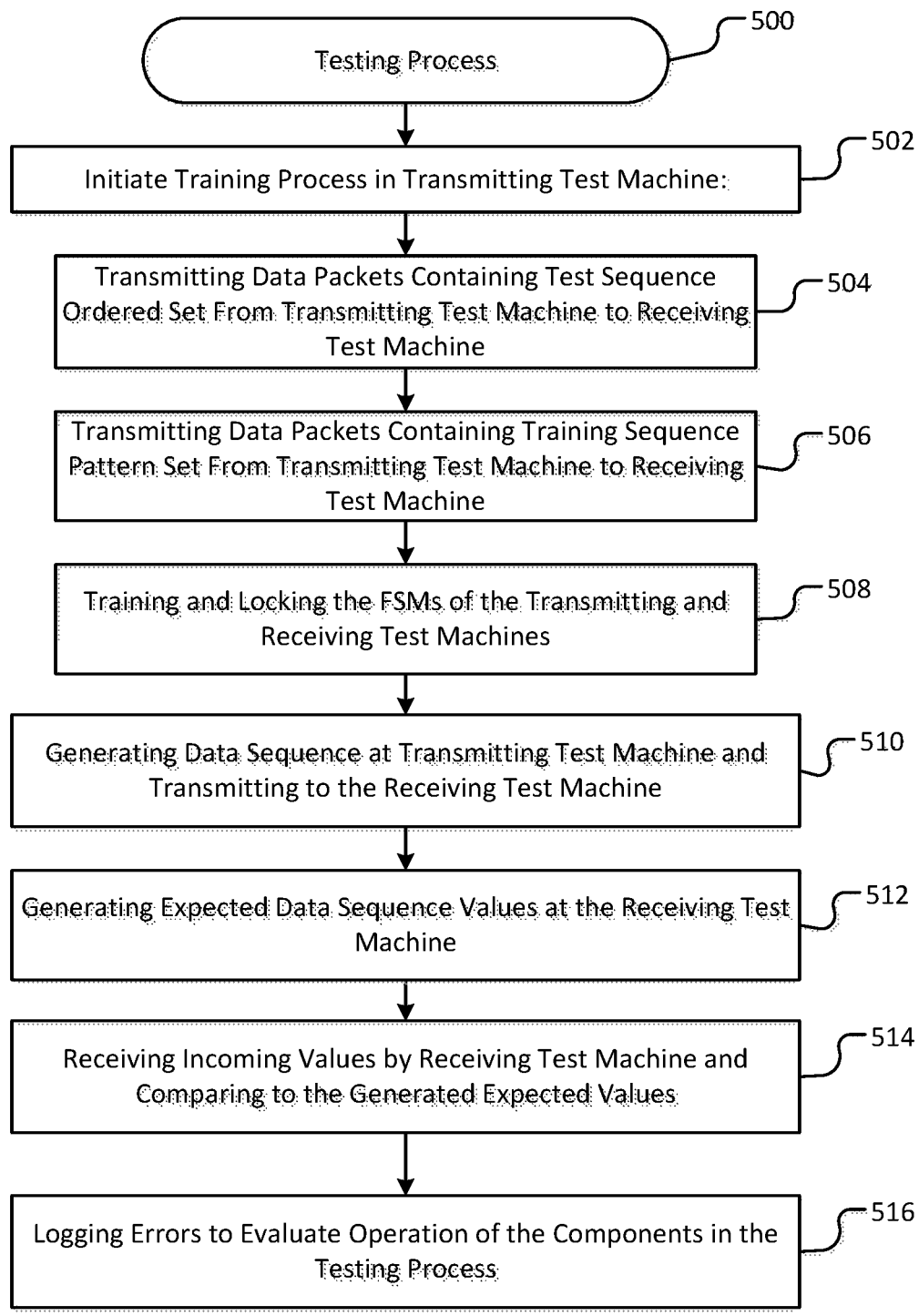
FIG. 5 is a flowchart to illustrate a process for testing of an apparatus through a high speed switch according to an embodiment.

FIG. 5 is a flowchart to illustrate a process for testing of an apparatus through a high speed switch according to an embodiment. In some embodiments, a testing process 500 may include the following:

502: Initiating a training process in a transmitting test machine, wherein the training process may include:

504: Transmitting data packets containing a Test Sequence Ordered Set from the transmitting test machine to a receiving test machine of an endpoint physical layer (PHY) logic element, wherein the test machines may be implemented in components as illustrated in FIG. 1 or FIG. 4;

506: Transmitting data packets containing a Training Sequence Pattern Set from the transmitting test machine to the receiving test machine; and

508: Training and synchronously locking FSMs of the transmitting and receiving testing machines to enable the test operation.

510: Generating a data sequence, such as generating the data sequence using a particular polynomial, and transmitting the data sequence from the transmitting test machine to the receiving test machine.

512: Generating at the receiving test machine an expected data sequence, such as sequence based on the same polynomial applied by the transmitting data machine.

514: Comparing the incoming data values received by the receiving test machine generated expected data values.

516: Logging any errors identified in the comparison between the incoming data and the expected data for use in evaluating the components in the testing process.

Figure 6:
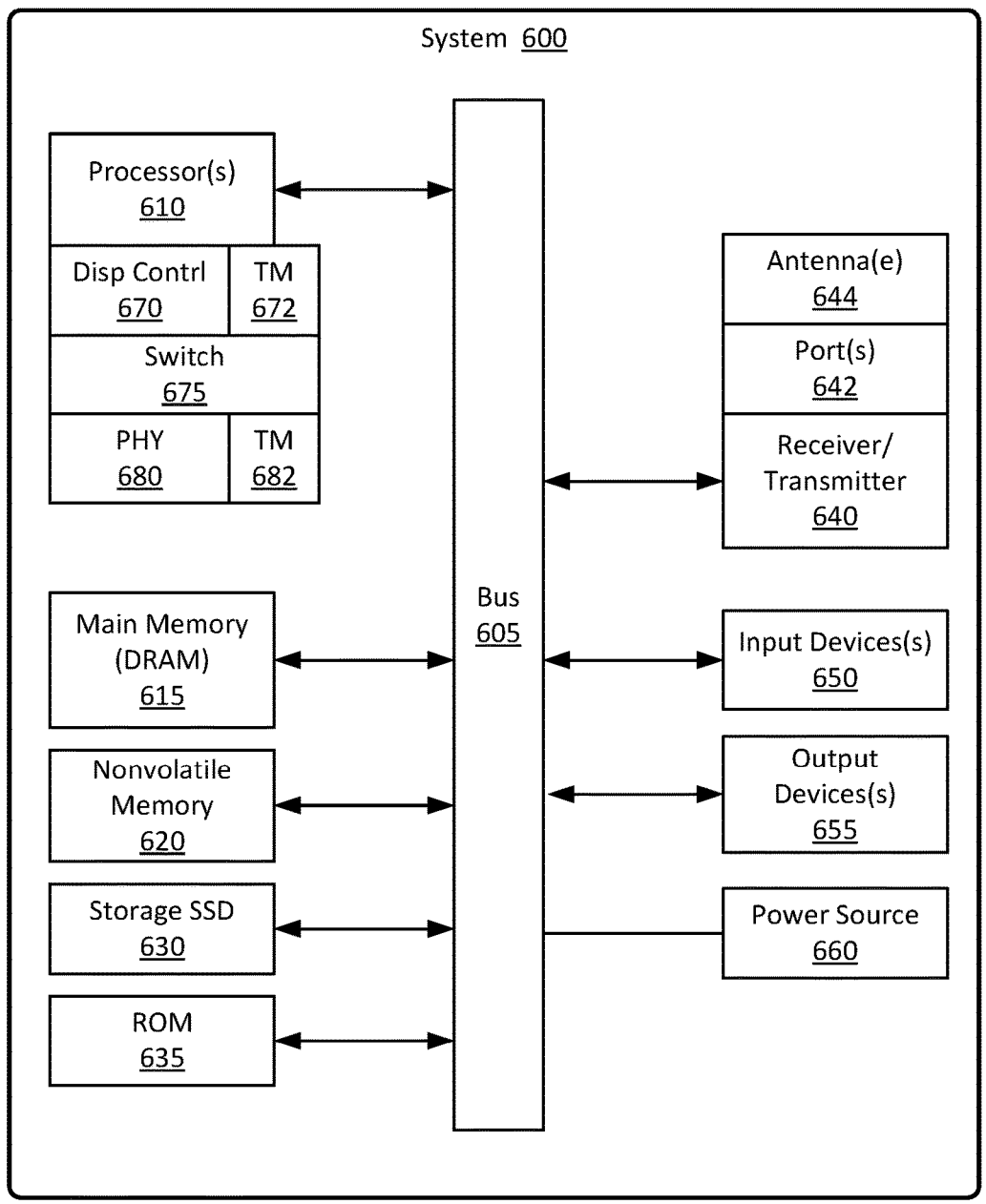
FIG. 6 is an illustration of a system to provide testing of a display controller through a high speed switch according to an embodiment.

FIG. 6 is an illustration of a system to provide testing of a display controller through a high speed switch according to an embodiment. In this illustration, certain standard and well-known components that are not germane to the present description are not shown. Elements shown as separate elements may be combined, including, for example, an SoC (System on Chip) combining multiple elements on a single chip.

In some embodiments, the system 600 may include a processing means such as one or more processors 610 coupled to one or more buses or interconnects, shown in general as bus 605. The processors 610 may comprise one or more physical processors and one or more logical processors. In some embodiments, the processors may include one or more general-purpose processors or special-purpose processors.

In some embodiments, the system 600 includes elements including a display controller 670; a high speed switch 675, which may include a Thunderbolt or other switch; and one or more physical layer (PHY) logic elements 680 for connection of devices. In some embodiments, the system includes built-in test apparatus to enable testing through the switch 675, including test machines 672 and 682, which are replicas of each other at least in part. In some embodiments, the test machines may be implemented in components as illustrated in FIG. 1 or FIG. 4.

The bus 605 is a communication means for transmission of data. The bus 605 is illustrated as a single bus for simplicity, but may represent multiple different interconnects or buses and the component connections to such interconnects or buses may vary. The bus 605 shown in FIG. 6 is an abstraction that represents any one or more separate physical buses, point-to-point connections, or both connected by appropriate bridges, adapters, or controllers.

In some embodiments, the system 600 further comprises a random access memory (RAM) or other dynamic storage device or element as a main memory 615 for storing information and instructions to be executed by the processors 610. Main memory 615 may include, but is not limited to, dynamic random access memory (DRAM).

The system 600 also may comprise a non-volatile memory 620; a storage device such as a solid state drive (SSD) 630; and a read only memory (ROM) 635 or other static storage device for storing static information and instructions for the processors 610.

In some embodiments, the system 600 includes one or more transmitters or receivers 640 coupled to the bus 605. In some embodiments, the system 600 may include one or more antennae 644, such as dipole or monopole antennae, for the transmission and reception of data via wireless communication using a wireless transmitter, receiver, or both, and one or more ports 642 for the transmission and reception of data via wired communications. Wireless communication includes, but is not limited to, Wi-Fi, Bluetooth™, near field communication, and other wireless communication standards.

In some embodiments, system 600 includes one or more input devices 650 for the input of data, including hard and soft buttons, a joy stick, a mouse or other pointing device, a keyboard, voice command system, or gesture recognition system.

In some embodiments, system 600 includes an output display 655, where the output display 655 may include a liquid crystal display (LCD) or any other display technology, for displaying information or content to a user. In some environments, the output display 655 may include a touch-screen that is also utilized as at least a part of an input device 650. Output display 655 may further include audio output, including one or more speakers, audio output jacks, or other audio, and other output to the user.

The system 600 may also comprise a battery or other power source 660, which may include a solar cell, a fuel cell, a charged capacitor, near field inductive coupling, or other system or device for providing or generating power in the system 600. The power provided by the power source 660 may be distributed as required to elements of the system 600.

In some embodiments, an apparatus includes a display controller including a first test machine; a high speed switch coupled with the display controller; and one or more physical layer (PHY) logic elements including a first PHY, the first PHY including a second test machine, the second test machine including a second finite state machine, the first test machine and second test machine being replicas of each other at least in part. In some embodiments, the first test machine and the second test machine are operable to synchronously lock, the first test machine to generate a data sequence and transmit the data sequence to the second test machine, the second test machine to generate an expected data sequence and compare the expected data sequence to a received data sequence from the first test machine.

In some embodiments, the first test machine is operable to transmit a Test Sequence Ordered Set and a Training Sequence Pattern Set to the second test machine.

In some embodiments, the first test machine and second test machine are operable to synchronously lock with each other utilizing the Test Sequence Ordered Set and the Training Sequence Pattern Set.

In some embodiments, the first test machine includes a first finite state machine and the second test machine includes a second finite state machine.

In some embodiments, the first test machine is to generate the data sequence based on a first polynomial, the data sequence being a PRBS (pseudorandom binary sequence) pattern. In some embodiments, the second test machine is to generate the expected data sequence based on the first polynomial.

In some embodiments, the apparatus is a CPU (Central Processing Unit) chip.

In some embodiments, the high speed switch is a Thunderbolt™ switch.

In some embodiments, an IO (Input Output) adapter coupled between the high speed switch and the one or more PHY logic elements.

In some embodiments, a non-transitory computer-readable storage medium having stored thereon data representing sequences of instructions that, when executed by a processor, cause the processor to perform operations including initiating a training process in a transmitting test machine of a display controller; generating a data sequence and transmitting the data sequence from the transmitting test machine to a receiving test machine in a physical logic element (PHY); generating at the receiving test machine an expected data sequence; and comparing incoming data values received by the receiving test machine with the expected data sequence.

In some embodiments, the training process includes transmitting data packets containing a Test Sequence Ordered Set from the transmitting test machine to the receiving test machine; transmitting data packets containing a Training Sequence Pattern Set from the transmitting test machine to the receiving test machine; and training and locking the transmitting and receiving testing machines.

In some embodiments, generating the data sequence includes generating the data sequence based on a first polynomial, the data sequence being a PRBS (pseudorandom binary sequence) pattern.

In some embodiments, generating at the receiving test machine the expected data sequence includes generating the expected data sequence based on the first polynomial.

In some embodiments, the transmitting test machine is replicated in the receiving test machine at least in part.

In some embodiments, an apparatus includes means for initiating a training process in a transmitting test machine of a display controller; means for generating a data sequence and transmitting the data sequence from the transmitting test machine to a receiving test machine in a physical logic element (PHY); means for generating at the receiving test machine an expected data sequence; and means for comparing incoming data values received by the receiving test machine with the expected data sequence.

In some embodiments, the training process includes transmitting data packets containing a Test Sequence Ordered Set from the transmitting test machine to the receiving test machine; transmitting data packets containing a Training Sequence Pattern Set from the transmitting test machine to the receiving test machine; and training and locking the transmitting and receiving testing machines.

In some embodiments, the means for generating the data sequence includes means for generating the data sequence based on a first polynomial, the data sequence being a PRBS (pseudorandom binary sequence) pattern.

In some embodiments, the means for generating at the receiving test machine the expected data sequence includes means for generating the expected data sequence based on the first polynomial.

In some embodiments, the transmitting test machine is replicated in the receiving test machine at least in part.

In some embodiments, a system includes a CPU (Central Processing Unit) chip, the CPU chip including a display controller including a transmitting test machine, the transmitting test machine including a first finite state machine, a high speed switch coupled with the display controller, an IO (Input Output) adapter coupled with the high speed switch, and one or more physical layer (PHY) logic elements including a first PHY, the first PHY including a receiving test machine, the receiving test machine including a second finite state machine, the transmitting test machine and receiving test machine being replicas of each other at least in part; a memory to store data for the CPU chip; and an output device, the output device to generate a display based on data from the CPU chip. In some embodiments, the transmitting test machine and the receiving test machine are operable to synchronously lock, the transmitting test machine to generate a data sequence and transmit the data sequence to the receiving test machine, the receiving test machine to generate an expected data sequence and compare the expected data sequence to a received data sequence from the transmitting test machine.

In some embodiments, the transmitting test machine is operable to transmit a Test Sequence Ordered Set and a Training Sequence Pattern Set to the receiving test machine.

In some embodiments, the transmitting test machine and receiving test machine are operable to synchronously lock with each other utilizing the Test Sequence Ordered Set and the Training Sequence Pattern Set.

In some embodiments, the transmitting test machine is to generate the data sequence based on a first polynomial, the data sequence being a PRBS (pseudorandom binary sequence) pattern.

In some embodiments, the receiving test machine is to generate the expected data sequence based on the first polynomial.

In some embodiments, the high speed switch is a Thunderbolt™ switch.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
   a display controller including a first test machine;
   a high speed switch coupled with the display controller; and
   one or more physical layer (PHY) logic elements including a first PHY, the first PHY including a second test machine, the first test machine and second test machine being replicas of each other at least in part;
   wherein the first test machine and the second test machine are operable to synchronously lock, the first test machine to generate a data sequence and transmit the data sequence to the second test machine, the second test machine to generate an expected data sequence and compare the expected data sequence to a received data sequence from the first test machine, wherein the first test machine is operable to transmit a Training Sequence Pattern Set to the second test machine.

2. The apparatus of claim 1, wherein the first test machine is further operable to transmit a Test Sequence Ordered Set to the second test machine.

3. The apparatus of claim 2, wherein the first test machine and second test machine are operable to synchronously lock with each other utilizing the Test Sequence Ordered Set and the Training Sequence Pattern Set.

4. The apparatus of claim 1, wherein the first test machine includes a first finite state machine and the second test machine includes a second finite state machine.

5. The apparatus of claim 1, wherein the first test machine is to generate the data sequence based on a first polynomial, the data sequence being a PRBS (pseudorandom binary sequence) pattern.

6. The apparatus of claim 5, wherein the second test machine is to generate the expected data sequence based on the first polynomial.

7. The apparatus of claim 1, wherein the apparatus is a CPU (Central Processing Unit) chip.

8. The apparatus of claim 1, wherein the high speed switch is a Thunderbolt™ switch.

9. The apparatus of claim 1, further comprising an IO (Input Output) adapter coupled between the high speed switch and the one or more PHY logic elements.

10. A non-transitory computer-readable storage medium having stored thereon data representing sequences of instructions that, when executed by a processor, cause the processor to perform operations comprising:
  initiating a training process in a transmitting test machine of a display controller;
  generating a data sequence and transmitting the data sequence from the transmitting test machine to a receiving test machine in a physical logic element (PHY), wherein the training process includes: transmitting data packets containing a Training Sequence Pattern Set from the transmitting test machine to the receiving test machine;
  generating at the receiving test machine an expected data sequence; and
  comparing incoming data values received by the receiving test machine with the expected data sequence.

11. The medium of claim 10, wherein the training process further includes: transmitting data packets containing a Test Sequence Ordered Set from the transmitting test machine to the receiving test machine; and training and locking the transmitting and receiving testing machines.

12. The medium of claim 10, wherein generating the data sequence includes generating the data sequence based on a first polynomial, the data sequence being a PRBS (pseudo-random binary sequence) pattern.

13. The medium of claim 12, wherein generating at the receiving test machine the expected data sequence includes generating the expected data sequence based on the first polynomial.

14. The medium of claim 10, wherein the transmitting test machine is replicated in the receiving test machine at least in part.

15. A system comprising:
  a CPU (Central Processing Unit) chip, the CPU chip including:
    a display controller including a transmitting test machine, the transmitting test machine including a first finite state machine, a high speed switch coupled with the display controller, an IO (Input Output) adapter coupled with the high speed switch, and one or more physical layer (PHY) logic elements including a first PHY, the first PHY including a receiving test machine, the receiving test machine including a second finite state machine, the transmitting test machine and receiving test machine being replicas of each other at least in part; and a memory to store data for the CPU chip; and an output device, the output device to generate a display based on data from the CPU chip;
  wherein the transmitting test machine and the receiving test machine are operable to synchronously lock, the transmitting test machine to generate a data sequence and transmit the data sequence to the receiving test machine, the receiving test machine to generate an expected data sequence and compare the expected data sequence to a received data sequence from the transmitting test machine, wherein the transmitting test machine is operable to transmit a Training Sequence Pattern Set to the receiving test machine.

16. The system of claim 15, wherein the transmitting test machine is further operable to transmit a Test Sequence Ordered Set to the receiving test machine.

17. The system of claim 16, wherein the transmitting test machine and receiving test machine are operable to synchronously lock with each other utilizing the Test Sequence Ordered Set and the Training Sequence Pattern Set.

18. The system of claim 15, wherein the transmitting test machine is to generate the data sequence based on a first polynomial, the data sequence being a PRBS (pseudorandom binary sequence) pattern.

19. The system of claim 18, wherein the receiving test machine is to generate the expected data sequence based on the first polynomial.

20. The system of claim 15, wherein the high speed switch is a Thunderbolt™ switch.

* * * * *